(12) United States Patent
Ojima (10) Patent No.: US 7,155,995 B2
(45) Date of Patent: Jan. 2, 2007

(54) INJECTION MOLDED RESIN GEAR, INJECTION MOLDED RESIN ROTATING BODY, AND INJECTION MOLDED ARTICLE

(75) Inventor: Masaaki Ojima, Yaita (JP)

(73) Assignee: Enplas Corporation, Saitama (JP)

( * ) Notice: Subject to any disclaimer, the term of this patent is extended or adjusted under 35 U.S.C. 154(b) by 608 days.

(21) Appl. No.: 10/647,996

(22) Filed: Aug. 26, 2003

(65) Prior Publication Data

US 2004/0043100 A1  Mar. 4, 2004

(30) Foreign Application Priority Data

Aug. 28, 2002  (JP) .......................... P2002-248546

(51) Int. Cl.
    *F16H 55/14*  (2006.01)
(52) U.S. Cl. ...................... 74/461; 74/443; 74/DIG. 10
(58) Field of Classification Search .................. 74/443, 74/461, DIG. 10
    See application file for complete search history.

(56) References Cited

U.S. PATENT DOCUMENTS 4,601,684 A * 7/1986 Geary et al. ................ 474/144
6,274,074 B1 * 8/2001 Monie .......................... 264/255
2002/0014133 A1 * 2/2002 Kimizuka ..................... 74/460
2002/0029648 A1 * 3/2002 Noguchi et al. .............. 74/461

FOREIGN PATENT DOCUMENTS

JP  8-25501  1/1996

* cited by examiner

Primary Examiner—David M. Fenstermacher
(74) Attorney, Agent, or Firm—Bachman & LaPointe, P.C.

(57) ABSTRACT

An injection molded resin gear 1 has a rim 6 having teeth 7 on its outer periphery, a hub 4 for receiving therein a shaft, and a web 6 connecting the rim 6 to the hub 4. The thickness (t1) of the bottom 15 of the rim 6 is smaller than the thickness (t2) of the web 5. On the side faces 8 and 8 of the web 5, annular circumferential ribs 10, 11 and 12 protruding concentrically with the rim 6 and hub 4 are formed. The relationship between the thickness (t1) of the bottom 15 of the rim 6, the thickness (t2) of the web 5 and the thickness (t3) of the circumferential rib 12 is $t1 \leq t3 < t2$.

9 Claims, 9 Drawing Sheets

INJECTION MOLDED RESIN GEAR, INJECTION MOLDED RESIN ROTATING BODY, AND INJECTION MOLDED ARTICLE

BACKGROUND OF THE INVENTION

1. Field of the Invention

The present invention generally relates to a gear of a resin, such as an injection molded resin gear, for use in power transmission devices for various precision instruments, such as color copying machines, color printers and video tape recorders, various automotive parts and industrial equipment. The invention also relates to an injection molded resin rotating body, such as an injection molded resin gear, roller, pulley or sprocket, which may be often used in power transmission portions. Moreover, the invention relates to an injection molded article which is used as a dynamic injection molded resin rotating body, such as an injection molded resin gear or roller, or as a stationary shaft supporting member.

2. Description of the Prior Art

For example, tandem type color copying machines and color printers are designed to sequentially carry out steps of forming images of black (K), magenta (M), cyanogen (C) and yellow (Y) in a direction, in which a transfer material, such as a copy paper, is carried, to sequentially superpose and transfer images of different colors to the transfer material, which is carried by a carrier belt, to print a desired color image on the transfer material. In such color copying machines and color printers, an image forming unit for each color (K, M, C, Y) and a carrier belt are connected to a motor via gears to be operated by the driving force of the motor. Therefore, in order to enable a high quality color print, it is required to precisely operate the image forming unit for each color (K, M, C, Y) and the carrier belt to precisely transfer each color image to the transfer material. For that reason, the precision of gears for transmitting the rotation of the motor to the image forming unit and carrier belt is important. That is, if the precision of the gears is bad, the rotation of the motor is not precisely transmitted to the image forming unit and carrier belt, so that operation failure, such as irregular rotation, is caused in the image forming unit and carrier belt, thereby causing print failure, such as color deviation.

Users have requested to reduce the size, weight and price of the above described color copying machines and color printers and to reduce operation noises thereof.

Therefore, in the above described color copying machines and color printers, an injection molded resin gear, which has a higher precision than that of a cut metal gear and which can more greatly reduce the weight and operation noises than those of the metal gear, has been widely used as a gear for transmitting the rotation of a motor to an image forming unit or a carrier belt.

Figure 10:
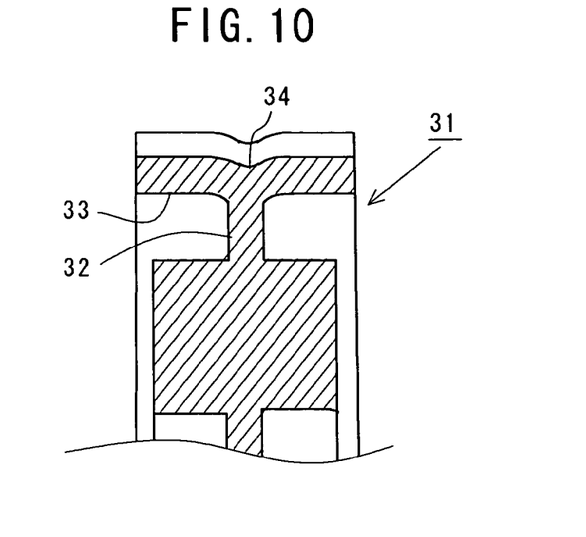
FIG. 10 is an enlarged view of a part of a conventional injection molded resin gear, which shows a state that failure (sink mark or shrink mark) is caused in the gear.

In a process for forming such an injection molded resin gear, a molten resin injected into a cavity shrinks when it is cooled to be solidified. The amount of shrinkage of the molten resin in a thick region of the resin is larger than that in a thin region thereof. As a result, for example, in an injection molded resin gear 31 as shown in FIG. 10, there are inherent problems (problems which are not caused by cut metal gears) in that the diameter of the connecting portion of a web 32 to a rim 33 is more greatly reduced than that of a portion of the rim 33 on the end side thereof, so that a shrink mark 34 is produced in a substantially central portion in face width directions to deteriorate the precision of the gear (e.g. total alignment error). Therefore, in order to further improve the precision of the gear, it is important to reduce the difference in shrinkage between parts.

Figure 11:
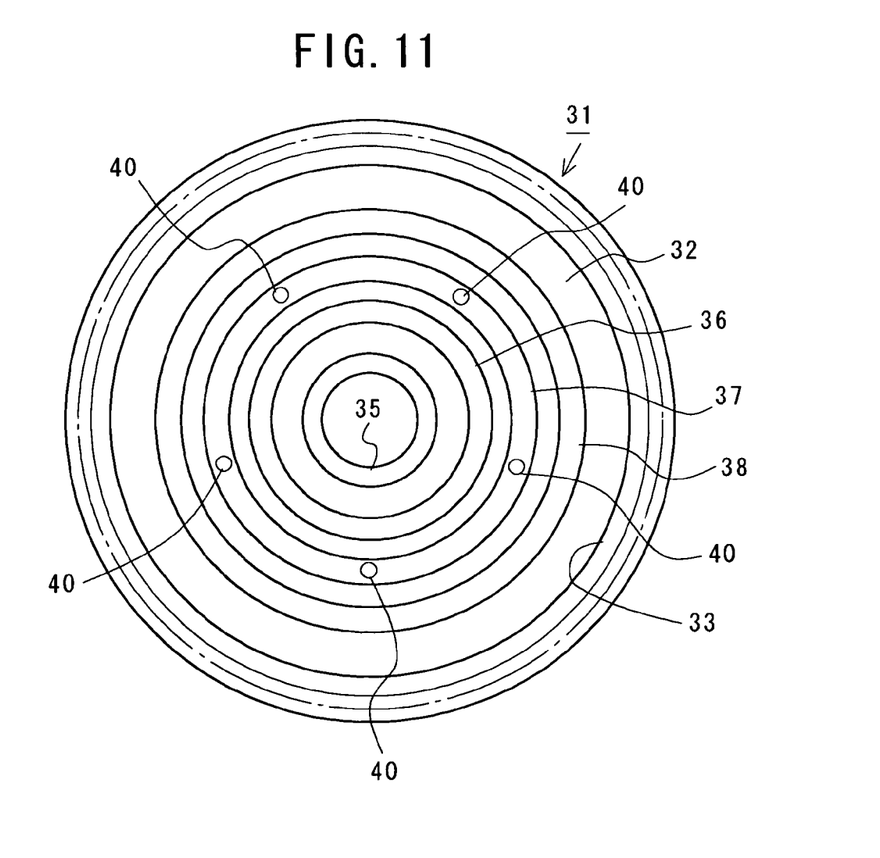
FIG. 11 is a side view of a conventional injection molded resin gear, which is viewed from the side of a web.

As shown in FIG. 11, the inventors have proposed an injection molded resin gear 31 wherein a web 32 has a plurality of circumferential ribs 36, 37 and 38 arranged concentrically with a hub 35, at least one 37 of the plurality of circumferential ribs 36–38 being arranged so as to face a plurality of injection molding pin point gates 40 (see Japanese Patent Laid-Open No. 8-25501). This conventional injection molded resin gear 31 is formed by allowing most of a molten resin, which is injected from the pin point gates 40, to flow along the circumferential rib 37 in circumferential directions and by allowing the molten resin to flow inwardly and outwardly in radial directions from the circumferential rib 37. Thus, the flow of the resin is equalized in radial directions as a whole to make distribution in rate of shrinkage uniform, so that the gear is formed so as to have an excellent roundness. However, in recent years, with the innovative improvement of performance of precision instruments and so forth using the injection molded resin gear 31, it is desired to provide more precise injection molded resin gears.

Similar to the above described injection molded resin gear 31, it is desired to develop a technique for more precisely forming the shape of an injection molded resin rotating body, such as an injection molded resin pulley, sprocket or roller, which forms a part of a power transmission mechanism, to more precisely and smoothly transmit the rotation thereof.

In precision instruments and so forth using the injection molded resin gear 31, it is required to precisely support a dynamic (sliding or rotating) shaft or a stationary (fixed) shaft on a frame or the like. In such a case, there is used a shaft supporting member (an injection molded article) which is injection-molded so as to substantially have the same shape as that of an injection molded resin roller. The outer cylindrical portion of this shaft supporting member is designed to be fixed to a frame or the like, and the inner cylindrical portion thereof is designed to support thereon a shaft. The shaft supporting member does not rotate unlike injection molded resin rotating bodies, such as injection molded resin gears and rollers. However, it is desired to improve the precision of the shape of the shaft supporting member in order to prevent the deviation in alignment of the shaft and so forth.

SUMMARY OF THE INVENTION

It is therefore an object of the present invention to eliminate the aforementioned problems and to provide a precise injection molded resin gear.

It is another object of the present invention to improve the precision of an injection molded resin rotating body, such as an injection molded resin pulley, sprocket or roller, which forms a power transmission mechanism, similar to an injection molded resin gear.

It is a further object of the present invention to improve the precision of an injection molded article, such as a shaft supporting member, which is formed to substantially have the same shape as that of an injection molded resin roller so as to be capable of supporting thereon a movable or stationary shaft.

In order to accomplish the aforementioned and other objects, according to one aspect of the present invention, an injection molded resin gear comprises: a rim having teeth on an outer periphery thereof; a hub for receiving therein a shaft; and a web connecting the rim to the hub, wherein a bottom of the rim has a smaller thickness than that of the web.

In this injection molded resin gear, the thickness of the bottom of the rim may be smaller than the thickness of the web in the vicinity of a connecting portion of the rim to the web.

The injection molded resin gear may further comprise an annular circumferential rib formed on the web, the circumferential rib protruding concentrically with the rim and hub, and the relationship between the thickness ($t1$) of the bottom of the rim, the thickness ($t2$) of the web and a thickness ($t3$) of the circumferential rib may be $t1 \leq t3 < t2$.

The injection molded resin gear may further comprise an annular circumferential rib formed on the web nearer to the hub than the rim, the circumferential rib protruding concentrically with the rim and hub, and the injection molded resin gear may be formed by injecting a molten resin from a plurality of pin point gates which are arranged at regular intervals in circumferential directions of the circumferential rib.

The injection molded resin gear may further comprise a resin guiding protrusion for guiding a molten resin, which is injected from a pin point gate, to the hub, the resin guiding protrusion protruding from an outer periphery of the hub on one side of the web so as to correspond to the pin point gate.

The injection molded resin gear may further comprise a plurality of annular circumferential ribs formed on the web, the circumferential ribs protruding concentrically with the rim and hub, at least adjacent two of the plurality of circumferential ribs being connected to each other by a plurality of radial ribs extending in radial directions, and the relationship between the thickness ($t1$) of the bottom of the rim, the thickness ($t2$) of the web and a thickness ($t3$) of at least one of the circumferential ribs may be $t1 \leq t3 < t2$.

The injection molded resin gear may further comprise a detent formed on the web, the detent engaging a gear driving member, which rotates with the shaft, to allow the injection molded resin gear to rotate with the gear driving member. This detent may be a radial rib.

According to another aspect of the present invention, an injection molded resin gear comprises: a rim; a hub; and a web connecting the rim to the hub, the web having a plurality of annular circumferential ribs which surround the hub concentrically with each other, at least adjacent two of the circumferential ribs being connected to each other in radial directions by means of a plurality of radial ribs which are arranged at regular intervals in circumferential directions, wherein the injection molded resin gear is formed by injecting a molten resin from a plurality of pin point gates arranged at regular intervals on a circle, which is arranged concentrically with the hub, nearer to the hub than the adjacent two of the circumferential ribs, the radial ribs being formed so as to be displaced from a straight line which radially extends from a rotation center of the gear via each of the pinpoint gates and so as to be displaced from a straight line which passes through the rotation center of the gear and a center between adjacent two of the pin point gates, and no radial rib is formed between one of the circumferential ribs, which is nearest to the pin point gates, and the pin point gates.

According to a further aspect of the present invention, an injection molded resin rotating body comprises: a substantially cylindrical rim; a hub for receiving therein a shaft; and a web connecting the rim to the hub, wherein a thinnest portion of the rim has a smaller thickness than that of the web.

According to a still further aspect of the present invention, an injection molded article comprises: an outer cylindrical portion; an inner cylindrical portion for receiving therein a shaft; and a disk-shaped portion connecting the outer cylindrical portion to the inner cylindrical portion, wherein the outer cylindrical portion has a smaller thickness than that of the disk-shaped portion.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below in detail.

[First Preferred Embodiment]

Figure 1:
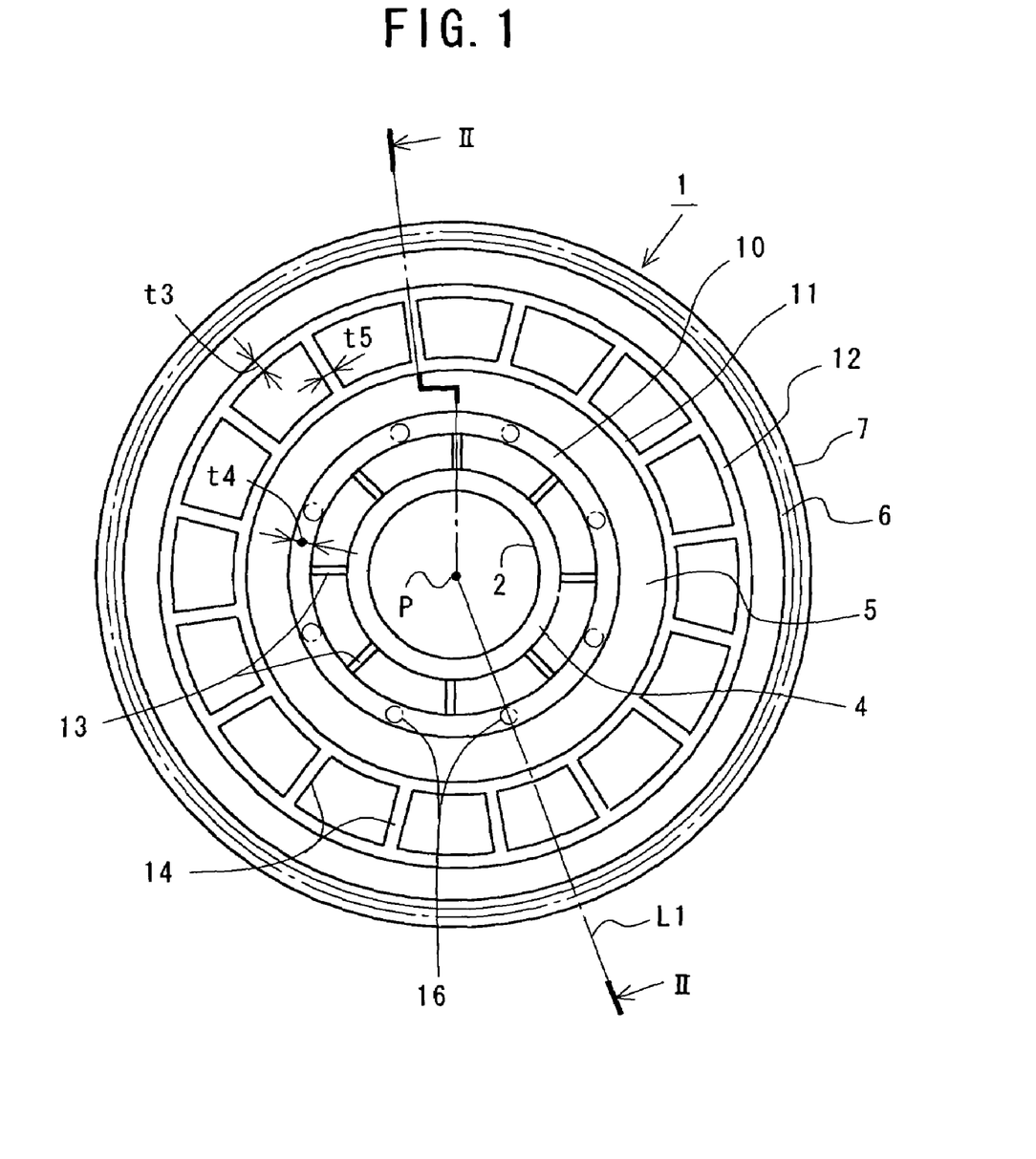
FIG. 1 is a side view of the first preferred embodiment of an injection molded resin gear according to the present invention, which is viewed from the side of a web.
Figure 2:
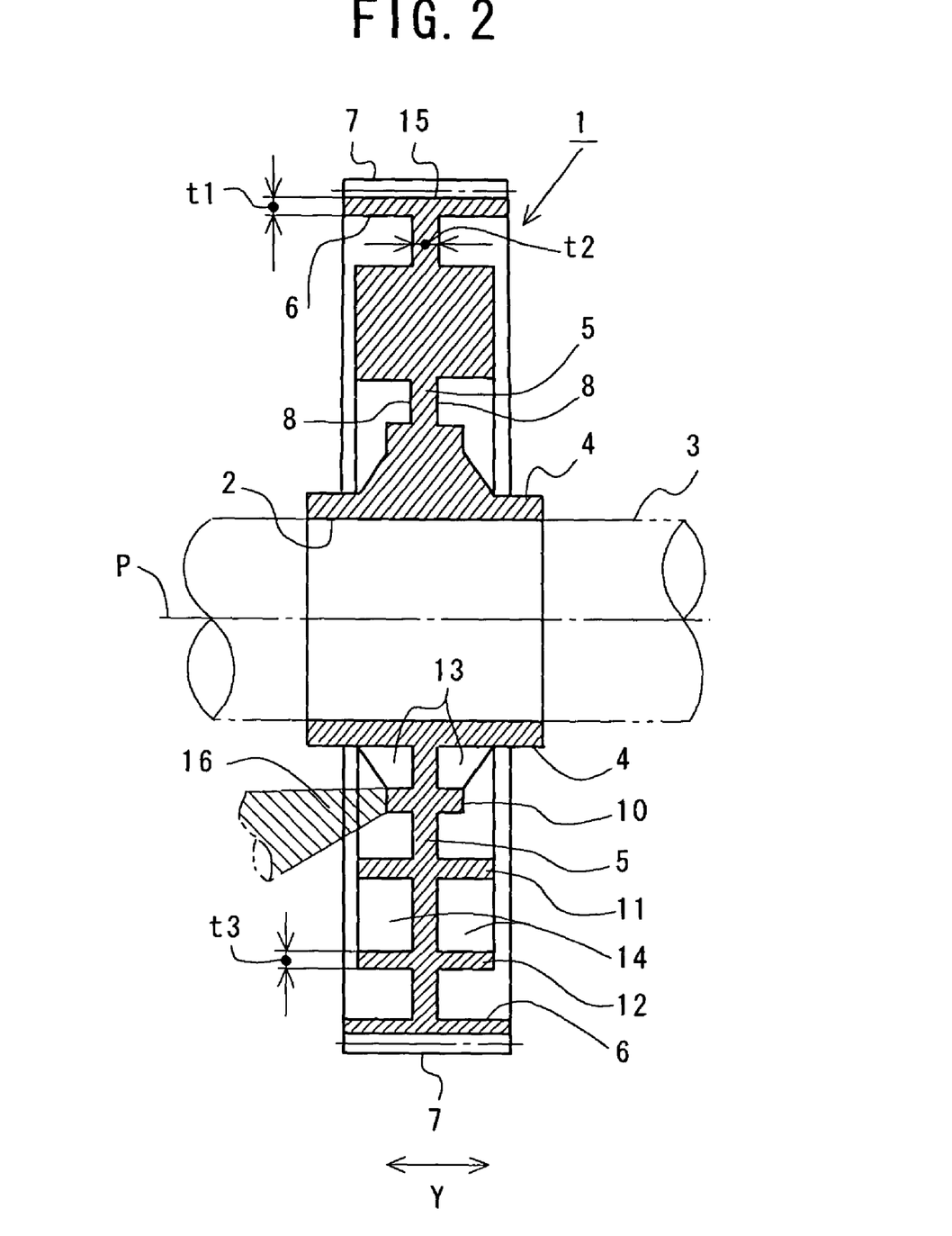
FIG. 2 is a sectional view taken along line II—II of FIG. 1.

FIGS. 1 and 2 show the first preferred embodiment of an injection molded resin gear 1 according to the present invention, FIG. 1 being a side view of the injection molded resin gear 1 and FIG. 2 being a sectional view taken along line II—II of FIG. 1.

The injection molded resin gear 1 is formed by injecting a resin material, such as polyacetal, polyamide, polybutylene terephthalate or polycarbonate.

Figure 3:
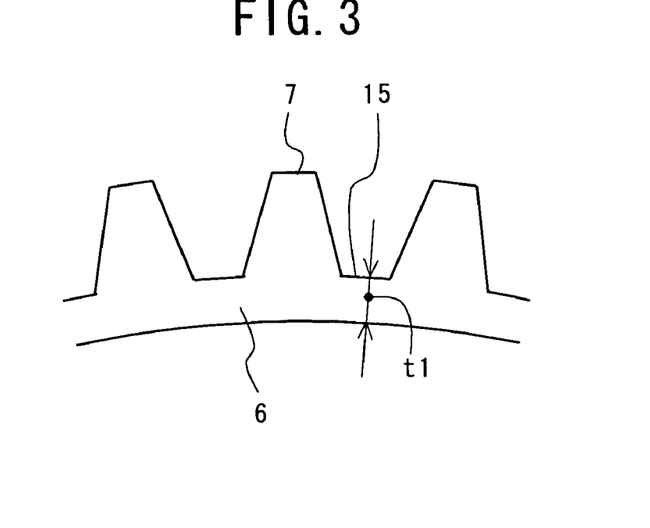
FIG. 3 is an enlarged view of a part of a rim of the injection molded resin gear of FIG. 1.

The injection molded resin gear 1 shown in these figures comprises a substantially cylindrical hub (inner cylindrical portion) 4 having an axial hole 2 into which a shaft 3 is fitted, a substantially disk-shaped web (disk-shaped portion) 5 formed on the outer peripheral side of the hub 4, and a substantially cylindrical rim (outer cylindrical portion) 6 formed on the outer peripheral side of the web 5. The injection molded resin gear 1 is formed with teeth 7 on the outer periphery of the rim 6 (see FIG. 3). The web 5 is arranged in a substantially central portion in face width directions (see FIG. 2). The injection molded resin gear 1 is substantially symmetric with respect to a plane including the center of the web 5 (see FIG. 2).

On both sides 8, 8 of the web 5, a plurality of (first through third) annular circumferential ribs 10, 11 and 12 are formed concentrically with the hub 4 and rim 6. The first circumferential rib 10 is arranged so as to face the outer periphery of the hub 4 to be connected thereto by means of a plurality of first radial ribs 13 which extend radially from the outer periphery of the hub 4. The second circumferential rib 11 is arranged so as to face the outer periphery of the first circumferential rib 10 apart therefrom. The third circumferential rib 12 is arranged between the second circumferential rib 11 and the rim 6 to be connected to the second circumferential rib 11 by means of a plurality of second radial ribs 14 which extend radially from the outer periphery of the second circumferential rib 11.

The first radial ribs 13 are arranged on the outer periphery of the hub 4 at regular intervals so as to protrude from the sides 8, 8 of the web 5. The side shape of the first radial rib 13 is formed so that its width gradually increases from the first circumferential rib 10 toward the hub 4 (see FIG. 2). Thus, the root portion of the web 5 (the connecting portion of the web 5 to the hub 4) can be reinforced. The second radial ribs 14 are arranged on the outer periphery of the second circumferential rib 11 at regular intervals so as to protrude from the sides 8, 8 of the web 5. The second radial ribs 14 have the same height (width) as that of the second and third circumferential ribs 11 and 12.

Figure 4:
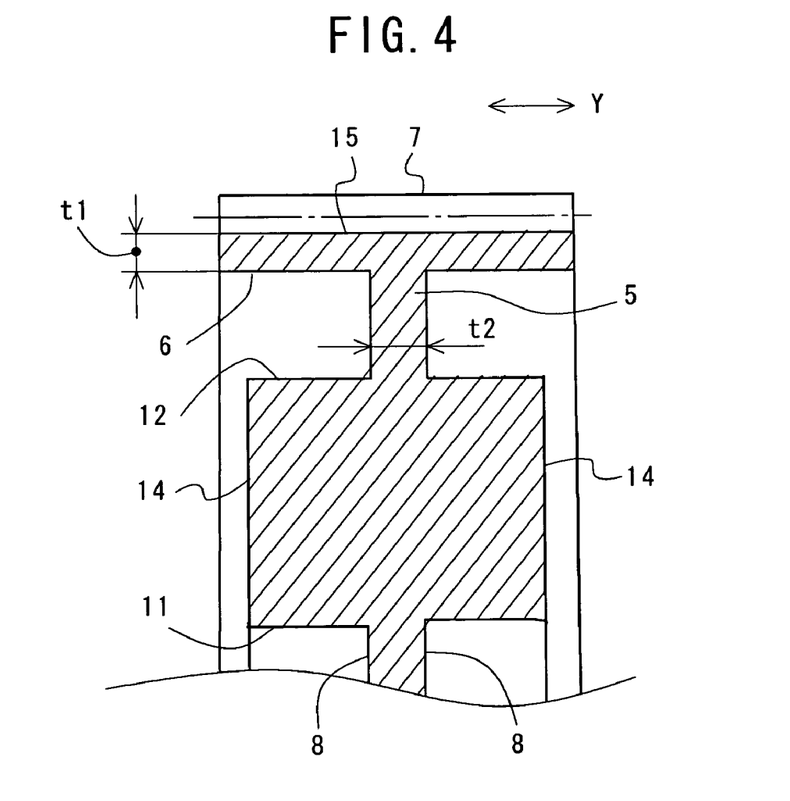
FIG. 4 is an enlarged sectional view of a part of FIG. 2.

FIG. 4 is an enlarged view of a part of FIG. 2 for explaining the relationship between the thickness (t1) of the bottom 15 of the rim 6 and the thickness (t2) of the web 5. As shown in this figure, the injection molded resin gear 1 in this preferred embodiment is formed so that the thickness (t1) of the bottom 15 of the rim 6 is smaller than the thickness (t2) of the web 5 (t1<t2). The injection molded resin gear 1 is also formed so that the thickness of the bottom 15 of the rim 6 is substantially constant (t1) in face width directions Y. In the injection molded resin gear 1 in this preferred embodiment, the thickness of each part (t1, t2, t3) is determined so that the thickness (t3) of the second and third circumferential ribs 11 and 12 (see FIG. 1), the thickness (t1) of the bottom 15 of the rim 6, and the thickness (t2) of the web 5 is t1≦t3<t2.

As shown in FIG. 1, the first circumferential rib 10 is arranged so as to face a plurality of injection molding pin point gates 16. The pin point gates 16 are arranged at regular intervals in circumferential directions of the first circumferential rib 10 so as to concentrically surround the hub 4 similar to the first circumferential rib 10. The optimum value of the thickness (t4) of the first circumferential rib 10 is suitably determined in accordance with the dimension of the tips of the pin point gates 16. The height of the first circumferential rib 10 is set so that scars caused by cutting the pin point gates 16 are not obstacle without carrying out any after-treatments.

The optimum value of the thickness (t5) of the second radial ribs 14 is determined with respect to the thickness (t1) of the bottom 15 of the rim 6 and the thickness (t2) of the web 5 so that t1≦t5<t2. Furthermore, if the thickness (t5) of the second radial ribs 14 is set with respect to the thickness (t3) of the second and third circumferential ribs 11 and 12 so that t5<t3, the variation in flow of the molten resin can be more remarkably reduced by the second and third circumferential ribs 11 and 12, so that the flow of the molten resin can be more uniformly caused.

Referring to FIG. 1, the relationship between the pin point gates 16 and the first and second radial ribs 13 and 14 will be described below.

The first and second radial ribs 13 and 14 are displaced in circumferential directions from a straight line L1 which is drawn by connecting the rotation center P of the injection molded resin gear 1 and each of the pin point gates 16, i.e., a radial line L1 which is a straight line extending radially from the rotation center P, so as not to be arranged on the radial line L1. In addition, the first radial ribs 13 and the second radial ribs 14 are displaced in circumferential directions from each other so as not to be arranged on the same radial line.

If the first radial ribs 13 are arranged on the radial line L1, there is the possibility that the molten resin injected from the pin point gates 16 rapidly flows along the first radial ribs 13 in radial directions (due to a so-called runner effect caused by the radial ribs), to make the flow of the molten resin ununiform to deteriorate the roundness of the hub 4 to deteriorate the rotational accuracy of the injection molded resin gear 1. However, according to this preferred embodiment, it is possible to prevent such failure since the first radial ribs 13 are not arranged on the radial lines L1 passing through the pin point gates 16.

In addition, the second radial ribs 14 are not arranged on radial lines (weld lines) which are formed by the joining of the molten resin flowing out of adjacent two of the pin point gates 16. That is, the second radial ribs 14 are not arranged on the radial lines L1 and weld lines, in which the flow of the molten resin is easy to be ununiform, so that the ununiformity of the flow of the molten is not promoted.

According to the injection molded resin gear 1 with this construction, if the molten resin is injected into the cavity from the plurality of pin point gates 16 arranged at regular intervals in circumferential directions, the molten resin flows from the injected positions in radial directions. Most of the injected molten resin flows along the first circumferential rib 10 in circumferential directions, and part of the injected molten resin gradually flows in radial directions. Then, the molten resin flowing along the first circumferential rib 10 in circumferential directions meets the molten resin, which is injected from the adjacent pin point gates 16, to flow in radial directions.

The molten resin flowing from the first circumferential rib 10 outwardly in radial directions flows into the second circumferential rib 11 which is perpendicular to the direction of the flow of the molten resin and in which the cross-sectional area of the passage for the molten resin rapidly increases, so that the variation in flow of the molten resin can be suppressed by the second circumferential rib 11 even if the strength of the flow of the molten resin outwardly in radial directions slightly varies. Moreover, the molten resin flowing outwardly in radial directions from the second circumferential rib 11 passes through the web 5 and second radial ribs 14 to flow into the third circumferential rib 12 which is perpendicular to the direction of the flow of the molten resin and in which the cross-sectional area of the passage for the molten resin rapidly increases, so that the variation in flow of the molten resin can be suppressed by the third circumferential rib 12 even if the strength of the flow of the molten resin in radial directions from the second circumferential rib 11 to the third circumferential rib 12 slightly varies. As a result, the molten resin substantially uniformly flows inwardly and outwardly in radial directions from the first circumferential rib 10 to substantially make the cooling rate of the molten resin uniform to make the rate of shrinkage of the molten resin uniform in circumferential directions of the web 5, so that it is possible to form an injection molded resin gear 1 having a good roundness.

According to this preferred embodiment, the thickness (t1) of the bottom 15 of the rim 16 is smaller than the thickness (t2) of the web 5, so that the shrinkage of the rim 6 having the teeth 7 can be decreased. In addition, the second and third circumferential ribs 11 and 12 which are thinner than the web 5 are solidified prior to the solidification of the web 5, and then, the webs is solidified, so that the deformation of the web 5 due to the decrease of the diameter thereof can be suppressed by the second and third circumferential ribs 11 and 12, which are solidified prior to the solidification of the web 5, due to the time difference in solidification of the molten resin. As a result, the shrink mark in the connecting portion of the web 5 to the rim 6, i.e. in the substantially central portion in face width directions of the teeth 7, can be particularly decreased, so that shape error, such as total alignment error, can be decreased to more precisely form the injection molded resin gear 1.

According to this preferred embodiment, the first circumferential rib 10 is connected to the hub 4 by the first radial ribs 13, and the second circumferential rib 11 is connected to the third circumferential rib 12 by the second radial ribs 14. Therefore, the rigidity of the web 5 can be enhanced to suppress the deformation of the web 5 due to load during power transmission, so that it is possible to precisely transmit rotation.

According to this preferred embodiment, no radial ribs are not formed between the first circumferential rib 10, on which the pin point gate 16 are arranged, and the second circumferential rib 11 which are arranged radially outward from the first circumferential rib 10 so as to be adjacent thereto. Therefore, the first circumferential rib 10 functions as a ring gate, so that the balance of the filling of the molten resin can be improved.

As described above, according to this preferred embodiment, it is possible to obtain a precise injection molded resin gear 1 by the synergistic effect of the above described effects. Therefore, a color copying machine or color printer using the injection molded resin gear 1 in this preferred embodiment for transmitting power to a paper feeding carrier belt or a photosensitive material can prevent print failure, such as color deviation, to enable a high quality color print. In addition, a power transmission mechanism using the injection molded resin gear 1 in this preferred embodiment can precisely transmit power of an actuator, such as a motor.

Figure 5:
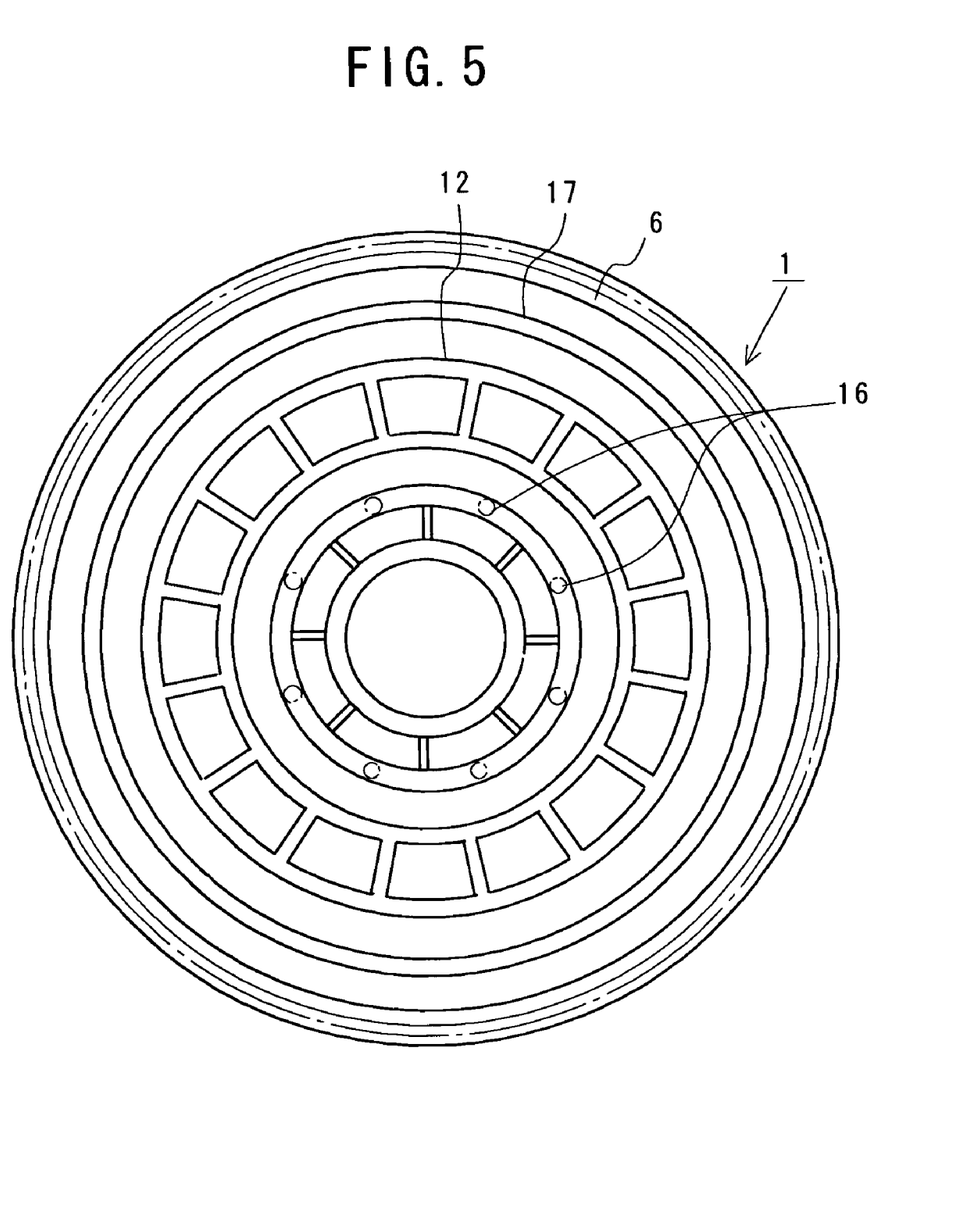
FIG. 5 is a side view of a modified example of the injection molded resin gear of FIG. 1.

Furthermore, a single or a plurality of circumferential ribs may be formed between the third circumferential rib 12 and the rim 6 in accordance with the outside diameter of the injection molded resin gear 1. FIG. 5 shows an injection molded resin gear 1 wherein a fourth circumferential rib 17 is formed between the third circumferential rib 12 and the rim 6, the fourth circumferential rib 17 being not connected to the third circumferential rib 12 and the rim 6 by radial ribs. With this construction, the rigidity of the web 5 can be enhanced, and the molten resin can more uniformly flow from the pin point gates 16 to the rim 6.

Figure 6:
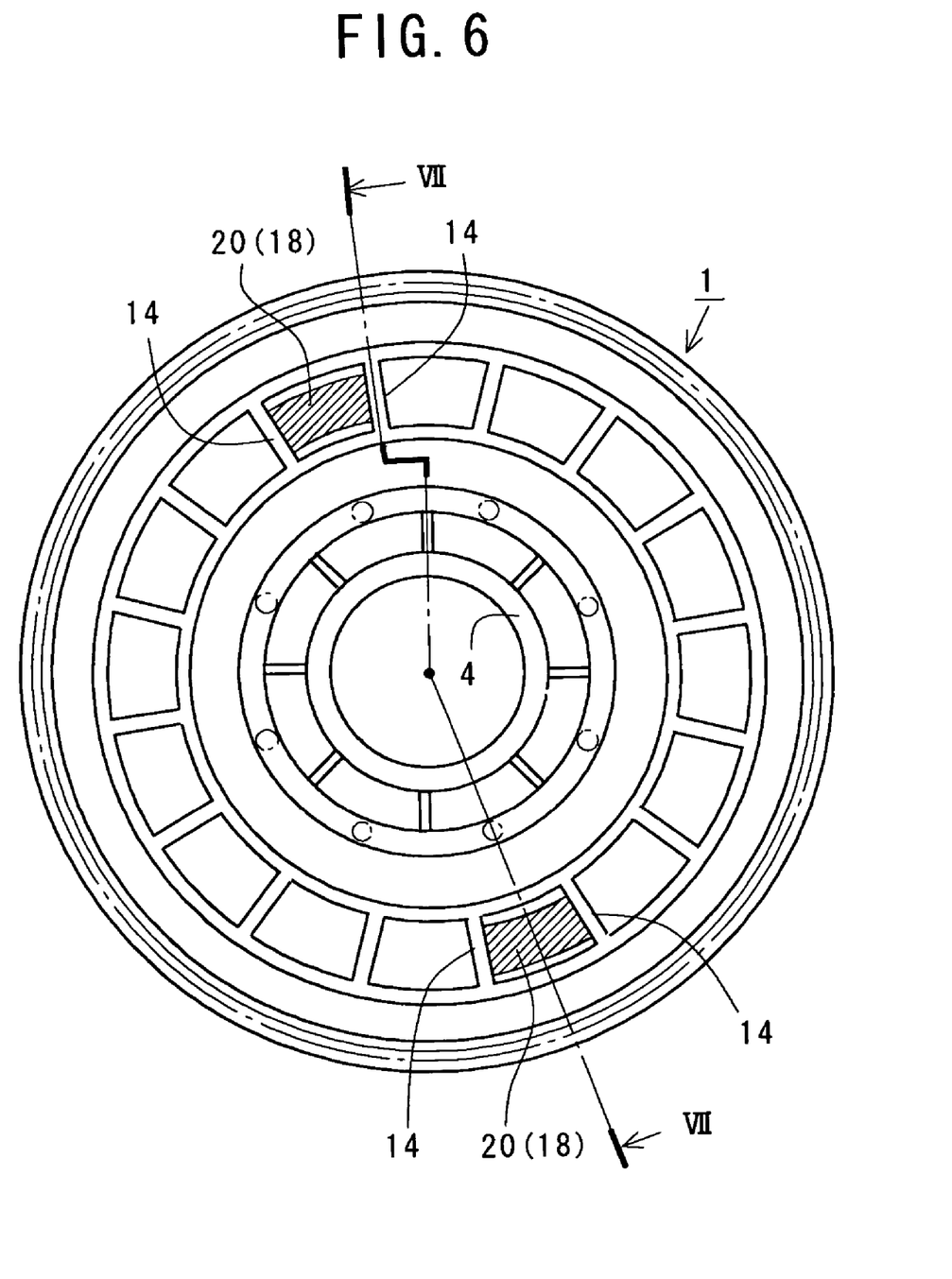
FIG. 6 is a view showing the relationship between the injection molded resin gear of FIG. 1 and a gear driving member.
Figure 7:
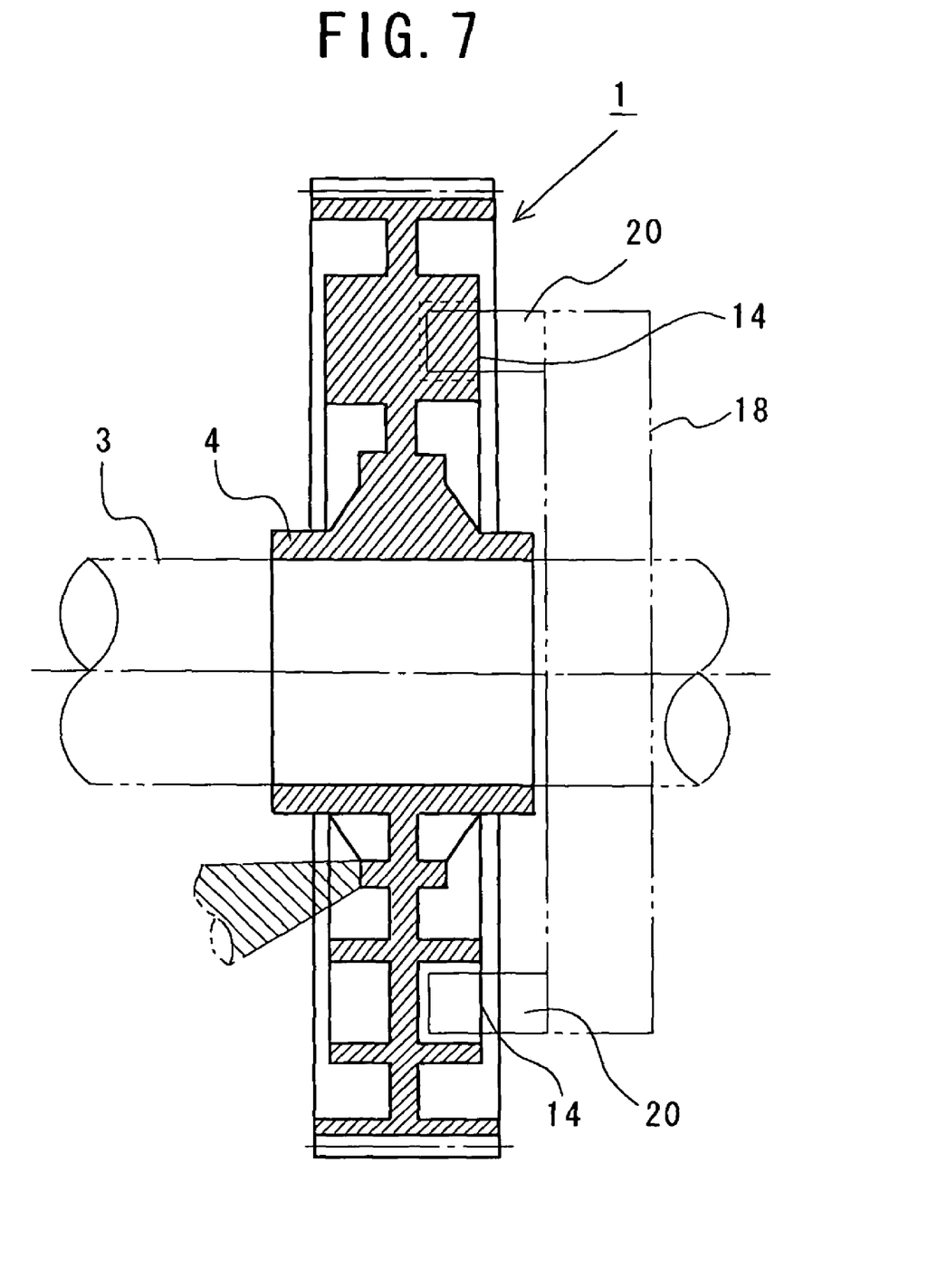
FIG. 7 is a sectional view taken along line VII—VII of FIG. 6.

FIGS. 6 and 7 show an example where the injection molded resin gear 1 in this preferred embodiment is driven. As shown in these figures, each of the protrusions 20 of gear driving members 18, which are mounted so as to be rotatable with the shaft 3 fitted into the hub 4, engages a space between adjacent two of the second radial ribs 14 to transmit the rotation of the injection molded resin gear 1 to the shaft 3 via the gear driving members 18 or to transmit the rotation of the shaft 3 to the injection molded resin gear 1 via the gear driving members 18. In this example, the engagement of the second radial ribs 14 with the protrusions 20 of the gear driving members 18 prevents the relative rotation of the injection molded resin gear 1 to the shaft 3, and the second radial ribs 14 function as a detent.

While each of the protrusions 20 of the gear driving members 18 has engaged the space between adjacent two of the second radial ribs 14 in the example shown in FIGS. 6 and 7, the present invention should not be limited thereto, but each of the protrusions 20 of the gear driving member 18 may engage a space between adjacent two of the first radial ribs 13. In this case, the first radial ribs 13 function as a detent.

The detent for the injection molded resin gear 1 should not be limited to the first or second radial ribs 13 or 14, but a simple protrusion or recessed portion being engageable with the protrusions 20 of the gear driving member 18 if it can prevent the relative rotation to the gear driving member 18.

[Second Preferred Embodiment]

Figure 8:
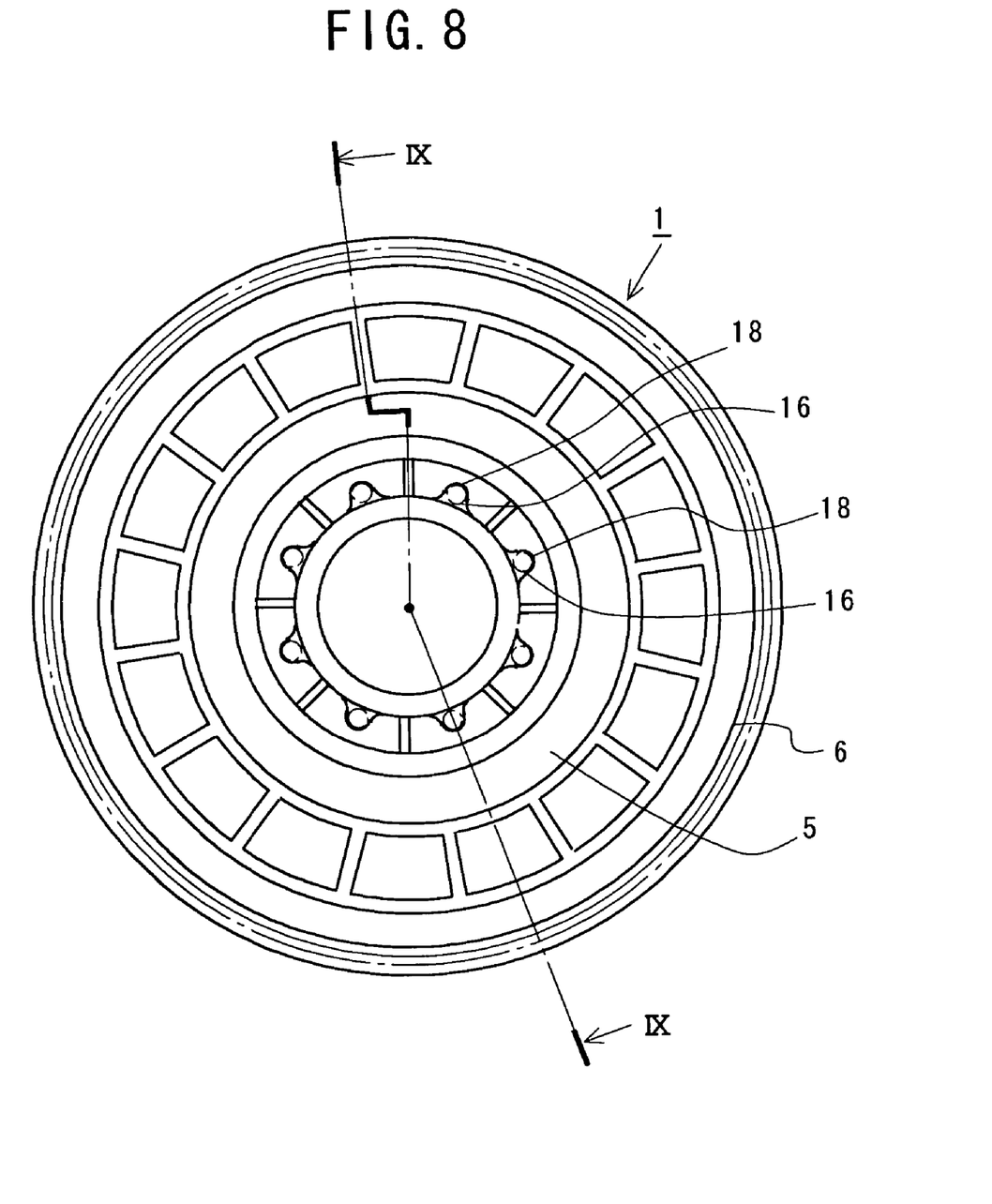
FIG. 8 is a side view of the second preferred embodiment of an injection molded resin gear according to the present invention, which is viewed from the side of a web.
Figure 9:
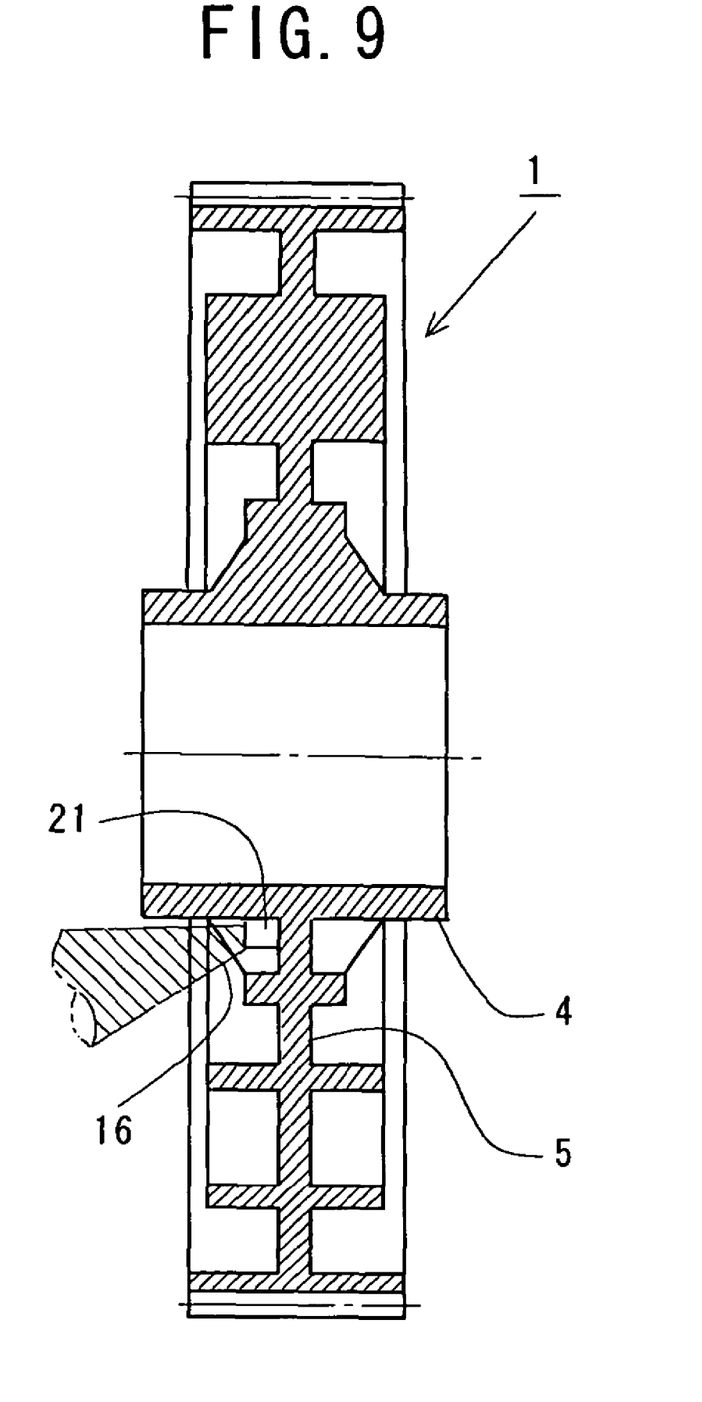
FIG. 9 is a sectional view taken along line IX—IX of FIG. 8.

FIGS. 8 and 9 show the second preferred embodiment of an injection molded resin gear according to the present invention. The injection molded resin gear 1 in this preferred embodiment has a plurality of resin guiding protrusions 21, which are arranged at regular intervals so as to correspond to pin point gages 16, for guiding a molten resin, which is injected from the pin point gates 16, to a hub 4.

According to this preferred embodiment with such a construction, the molten resin injected from the pinpoint gates 16 substantially uniformly flow in radial directions from the hub 4 to a rim 6. That is, since the hub 4 functions as a ring gate, weld lines (radial junction lines caused when the molten resins injected from adjacent two of the pin point gates 16 meet each other between the adjacent two of the pin point gates 16) are difficult to be caused on the web 5, so that the flow of the molten resin from the hub 4 toward the rim 6 is uniform in circumferential directions of the web 5.

The injection molded resin gear 1 in this preferred embodiment has the same construction as that in the first preferred embodiment, except for the position of the pin point gates 16. Therefore, the injection molded resin gear 1 in this preferred embodiment can obtain the same advantageous effects as those in the first preferred embodiment.

[Other Preferred Embodiments]

The present invention can not only be applied to the injection molded resin gear 1 in the above described preferred embodiments, but the invention may also be widely applied to injection molded resin rotating bodies, such as an injection molded resin sprocket wherein teeth engageable with a chain are formed on the outer periphery of a rim, and an injection molded resin pulley wherein teeth engageable with a toothed belt are formed on the outer periphery of a rim. In the injection molded resin sprocket, the thickness of the bottom of the rim corresponds to the thickness (t1) of the bottom 15 of the injection molded resin gear 1. In the injection molded resin pulley, the thickness of the bottom or the thickness of the core engaging the belt corresponds to the thickness (t1) of the bottom 15 of the injection molded gear 1.

Moreover, the present invention may be applied to a shaft supporting member (an injection molded article) which is injection-molted so that an outer cylindrical portion is connected to an inner cylindrical portion, which is concentrically therewith, by a disk-shaped member for supporting a sliding or rotating shaft on the inner cylindrical portion.

The present invention may also be applied to an injection molded resin roller (an injection molded article) wherein an inner cylindrical portion, into which a shaft is fitted, is connected to an outer cylindrical portion, which rolls on another member, by a disk-shaped portion. In these injection molded articles, the thickness of the outer cylindrical portion is smaller than the thickness of the disk-shaped portion in the vicinity of the connecting portion of the outer cylindrical portion to the disk-shaped portion. Thus, in the injection molded articles, the shrink mark in the connecting portion of the outer cylindrical portion to the disk-shaped portion can be decreased, so that the precision of the shape can be enhanced.

According to the present invention, at least one of the circumferential ribs 10, 11 and 12 and radial ribs 13 and 14 (all of the ribs 10 through 14 if necessary) may be omitted in view of the outside diameter of the injection molded resin gear 1.

In the injection molded resin gear 1 in the above described first and second preferred embodiments, the web 5 has been positioned in the substantially central portion in face width directions. However, the present invention should not be limited thereto, but the web 5 may be formed so as to be arranged on one side in face width directions.

In the above described preferred embodiments, if the thickness of the rim varies in face width directions, the thickness (t1) of the bottom 15 is smaller than the thickness (t2) of the web 5 in the vicinity of the connecting portion of the rim 6 to the web 5.

As described above, according to the present invention, the thickness of the bottom of the rim outside of the web is smaller than the thickness of the web, so that the deformation of the connecting portion of the rim to the web due to the decrease of the diameter thereof can be suppressed to inhibit the sink mark from being caused in the connecting portion of the rim to the web, thereby further improving the precision of the gear.

In addition, according to the present invention, the thickness of the outer cylindrical portion is smaller than the thickness of the disk-shaped portion, so that the deformation of the connecting portion of the outer cylindrical portion to the disk-shaped portion due to the decrease of the diameter thereof can be suppressed to inhibit the sink mark from being caused in the connecting portion of the outer cylindrical portion to the disk-shaped portion, thereby improving the precision of the shape of the injection molded article.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An injection molded resin gear comprising:
   a substantially cylindrical rim having teeth on an outer periphery thereof, said rim having a thickness (t1) in radial directions;
   a hub for receiving therein a shaft;
   a web connecting said rim to said hub, said web having a thickness (t2) in face width directions; and
   an annular circumferential rib formed on said web between said rim and said hub so as to protrude from said web concentrically with said rim and hub, said circumferential rib having a thickness (t3) in radial directions,
   wherein a relationship between the thickness (t1) of said rim, the thickness (t2) of said web and the thickness (t3) of the circumferential rib is $t1 \leq t3 < t2$.

2. An injection molded resin gear as set forth in claim 1, wherein the thickness (t1) of said rim is smaller than the thickness (t2) of said web in the vicinity of a connecting portion of said rim to said web.

3. An injection molded resin gear as set forth in claim 1, wherein said annular circumferential rib is formed on said web nearer to said hub than said rim, and wherein said injection molded resin gear is formed by injecting a molten resin from a plurality of pin point gates which are arranged at regular intervals in circumferential directions of said circumferential rib.

4. An injection molded resin gear as set forth in claim 1, which further comprises a resin guiding protrusion for guiding a molten resin, which is injected from a pin point gate, to said hub, said resin guiding protrusion protruding from an outer periphery of said hub on one side of said web so as to correspond to said pin point gate.

5. An injection molded resin gear comprising:
   a substantially cylindrical rim having teeth on an outer periphery thereof, said rim having a thickness (t1) in radial directions;
   a hub for receiving therein a shaft;
   a web connecting said rim to said hub, said web having a thickness (t2) in face width directions; and
   a plurality of annular circumferential ribs formed on said web between said rim and said hub so as to protrude from said web concentrically with said rim and hub, at least one of said plurality of circumferential ribs having a thickness (t3) in radial directions, at least adjacent two of said plurality of circumferential ribs being connected to each other by a plurality of radial ribs extending in radial directions,
   wherein a relationship between the thickness (t1) of said rim, the thickness (t2) of the web and the thickness (t3) of said at least one of said plurality of circumferential ribs is $t1 \leq t3 < t2$.

6. An injection molded resin gear as set forth in claim 1, which further comprises a detent formed on said web, said detent engaging a gear driving member, which rotates with said shaft, to allow said injection molded resin gear to rotate with said gear driving member.

7. An injection molded resin gear comprising:
   a substantially cylindrical rim;
   a hub; and
   a web connecting said rim to said hub, said web having a plurality of annular circumferential ribs which surround said hub concentrically with each other, at least adjacent two of said circumferential ribs being connected to each other in radial directions by means of a plurality of radial ribs which are arranged at regular intervals in circumferential directions,
   wherein said injection molded resin gear is formed by injecting a molten resin from a plurality of pin point gates arranged at regular intervals on a circle, which is arranged concentrically with said hub, nearer to said hub than said adjacent two of said circumferential ribs, said radial ribs being formed so as to be displaced from a straight line which radially extends from a rotation center of said gear via each of said pin point gates and so as to be displaced from a straight line which passes through the rotation center of said gear and a center between adjacent two of said pin point gates, and each of said radial ribs extending outwardly from one of said circumferential ribs, which is nearest to said pin point gates, is displaced from said pin point gates in circumferential directions.

8. An injection molded resin rotating body comprising:
a substantially cylindrical rim having a thickness (t1) in radial directions;
a hub for receiving therein a shaft;
a web connecting said rim to said hub, said web having a thickness (t2) in face width directions; and
an annular circumferential rib formed on said web between said rim and said hub so as to protrude from said web concentrically with said rim and hub, said circumferential rib having a thickness (t3) in radial directions,
wherein a relationship between the thickness (t1) of said rim, the thickness (t2) of said web and the thickness (t3) of the circumferential rib is $t1 \leq t3 < t2$.

9. An injection molded article comprising:
an outer cylindrical portion having a thickness (t1) in radial directions;
an inner cylindrical portion for receiving therein a shaft;
a disk-shaped portion connecting said outer cylindrical portion to said inner cylindrical portion, said disk-shaped portion having a thickness (t2) in face width directions; and
an annular circumferential rib formed on said disk-shaped portion between said outer cylindrical portion and said inner cylindrical portion so as to protrude from said disk-shaped portion concentrically with said outer and inner cylindrical portions, said circumferential rib having a thickness (t3) in radial directions,
wherein a relationship between the thickness (t1) of said outer cylindrical portion, the thickness (t2) of said disk-shaped portion and the thickness (t3) of said circumferential rib is $t1 \leq t3 < t2$.

* * * * *